US012752828B1

(12) United States Patent
Monroe

(10) Patent No.: US 12,752,828 B1
(45) Date of Patent: Oct. 6, 2026

(54) MATERIAL LIFT TRANSPORT DEVICE

(71) Applicant: John R. Monroe, Lynwood, WA (US)

(72) Inventor: John R. Monroe, Lynwood, WA (US)

( * ) Notice: Subject to any disclaimer, the term of this patent is extended or adjusted under 35 U.S.C. 154(b) by 274 days.

(21) Appl. No.: 18/598,109

(22) Filed: Mar. 7, 2024

(51) Int. Cl.
*B62B 5/06* (2006.01)
*B62B 1/14* (2006.01)
*B62B 1/26* (2006.01)
*B66F 5/04* (2006.01)

(52) U.S. Cl.
CPC ................ *B62B 1/14* (2013.01); *B62B 1/264* (2013.01); *B66F 5/04* (2013.01); *B62B 5/06* (2013.01)

(58) Field of Classification Search
CPC ... B62B 1/14; B62B 1/264; B62B 5/06; B66F 5/04
See application file for complete search history.

(56) References Cited

U.S. PATENT DOCUMENTS 4,536,123 A 8/1985 Snyder
4,932,639 A 6/1990 Fjellstrom
5,139,102 A * 8/1992 Pocapalia .......... B62D 53/0864 180/19.2
5,758,785 A * 6/1998 Spinosa .................. B66C 23/68 212/300
6,095,745 A 8/2000 Garnett
6,334,622 B1 1/2002 Romero
6,406,248 B1 6/2002 McGill et al.
9,321,471 B1 4/2016 Gedeon-Janvier
2001/0033064 A1 10/2001 Sinchok
2006/0273548 A1 12/2006 Bishman
2007/0114257 A1 5/2007 Brown
2007/0269300 A1 * 11/2007 Menard ................... B62B 3/001 414/444
2014/0265194 A1 9/2014 Gwin

* cited by examiner

*Primary Examiner* — Marc Q Jimenez
*Assistant Examiner* — James J Triggs
(74) *Attorney, Agent, or Firm* — Cramer Patent & Design, PLLC.; Aaron R. Cramer

(57) ABSTRACT

A material lift transport device is a transport device for a powered telescoping material lift. The device has an "L"-shaped body with storage for the lift and a pressurized tank, possibly for substances like CO2. It may have two wheels for movement, a sturdy frame with a comfortable grip handle, and hose holders at the back. Users can use the lift while it's attached or detach it, while the tank stays secure. The configuration is similar to a hand truck, which is suitable for various material lifts, and simplifies lifting tasks, offering users ease and efficiency.

2 Claims, 4 Drawing Sheets

MATERIAL LIFT TRANSPORT DEVICE

RELATED APPLICATIONS

None.

FIELD OF THE DEVICE

The present device pertains to a material lift and more specifically to a material lift transport device which permits a user to transport tools and compressed air with the material lift.

BACKGROUND OF THE DEVICE

It is very important to be able to store, move, and use specialized equipment effectively in today's construction and maintenance fields. The powered telescoping material lift is one of the most useful pieces of this kind of equipment because it helps workers move and lift things in a variety of settings. Although useful, it can be hard to make sure that the lift and all of its tools are always easy to get to and working when they are needed. Using standard systems and methods often causes parts to get lost or makes transporting them more difficult.

Therefore, it is the goal of the material lift transport device to solve these problems and more. This device not only makes it easier to store and move a powered flexible material lift, but it also keeps all the parts that are needed to set it up and run it in order and ready to use at all times. Essentially, the device has an "L"-shaped body in the middle, which holds both the material lift and a compressed tank, which is usually used to store gases like carbon dioxide ($CO_2$), along with all the necessary parts. The two wheels on the bottom of the device make it easy to use, like hand trucks.

The material lift transport device is a novel solution for workers in fields that use material lifts a lot to do their jobs. Its design focuses on making it easy to use, quick, and most importantly safe to operate.

SUMMARY OF THE DEVICE

The present disclosure describes a material lift transport device with a central "L"-shaped body. This body houses a bottom storage location for a telescoping material lift and an adjacent side storage location for a pressurized tank. The device may be supported by a pair of wheels and may have a central support frame extending to a handle.

The handle might be designed with an ergonomic grip for comfortable transportation. Additionally, a hose holder may be affixed to the handle for winding and storing a hose connected to the pressurized tank. An attachment strap with various coupling options, including buckles, clamps, and dual D-rings, might secure the pressurized tank.

The bottom storage may be adaptable to various telescoping material lift models, which may comprise an extendable shaft, an upper platen, and at least four outrigger supports. These supports might be collapsible for compact storage. The device may have controls associated with the pressurized tank to manage the release of its contents, with elements like control valves and pressure regulators.

The device might travel inclined paths, maintaining balance on its wheels. It may create a lift angle between the bottom storage and the ground. The pressurized tank might store substances like carbon dioxide ($CO_2$), and both the lift and the tank may be used while attached to the device.

The hose holder may have an "L" shape for easy hose access. The storage locations may be integrated within the "L"-shaped body, ensuring structural strength and storage efficiency. The central support frame may add stability during transportation. The device might be designed to keep all necessary components for the telescoping material lift easily accessible.

Usage may include securing the telescoping material lift and pressurized tank, transporting using the handle and wheels, and deploying both for operations. The system may provide a comprehensive solution for the storage, transport, and deployment of telescoping material lifts and related pressurized tanks.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
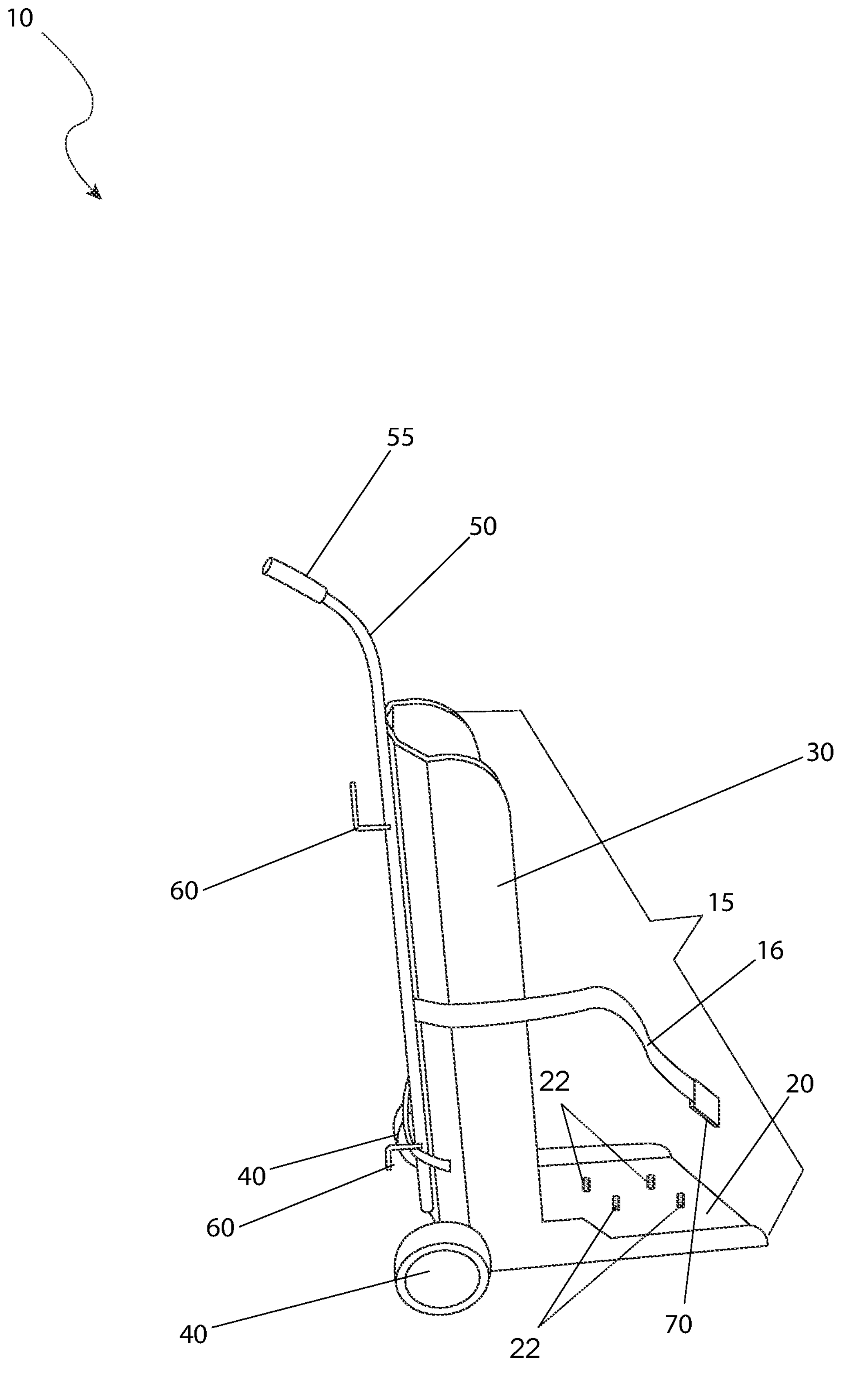
FIG. 1 is a perspective view of the material lift transport device 10, according to the preferred embodiment of the present invention.

10 material lift transport device
15 central "L"-shaped body
20 bottom storage location
22 mounting bolt
25 material lift
30 side storage location
35 pressurized tank
40 wheels
45 central support frame
50 handle
55 ergonomic grip
60 hose holder
65 attachment strap
70 coupling means
75 main extendable shaft
80 upper platen
85 outrigger support
90 control means
95 hose
100 inclined travel path "a"
105 grade
110 lift angle "b"

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the material lift transport device 10, according to the preferred embodiment of the present invention is disclosed. The material lift transport device (herein also described as the "device") 10, comprises an apparatus that allows for the storage, transport, and subsequent use of a powered telescoping material lift 25. It ensures that all components needed for the successful deployment and operation of the material lift 25 remain in place and are readily accessible as a unit when needed. The device 10 comprises a central "L"-shaped body 15 in which a bottom storage location 20 provides a storage location for a material lift 25 (not shown in this figure), while the side storage location 30 provides a storage location for a pressurized tank 35 (such as that storing carbon dioxide (CO2); not shown in this FIGURE), along with any needed accessories. A plurality of mounting bolts 22 (herein comprising four (4)) assists in removably mounting the material lift 25. The central "L"-shaped body 15 is supported by two (2) wheels 40, allowing the device 10 to roll over almost any type of surface. A central support frame 45 is provided on the rear of the side storage location 30 and extends from the wheels 40 and then upward, where it terminates in a handle 50 to provide the device 10 structural stability. The upper end of the handle 50 is provided with an ergonomic grip 55 to allow for a comfortable grip over long periods of travel. The rear of the handle 50 is provided with two (2) hose holders 60, in a general "L"-shape. The hose holders 60 is used to wind hoses 95 thereupon as will be illustrated herein below. An attachment strap 65, complete with coupling means 70, such as a buckle, clamp, dual D-rings or the like, is provided to secure the pressurized tank 35 within the side storage location 30.

Figure 2:
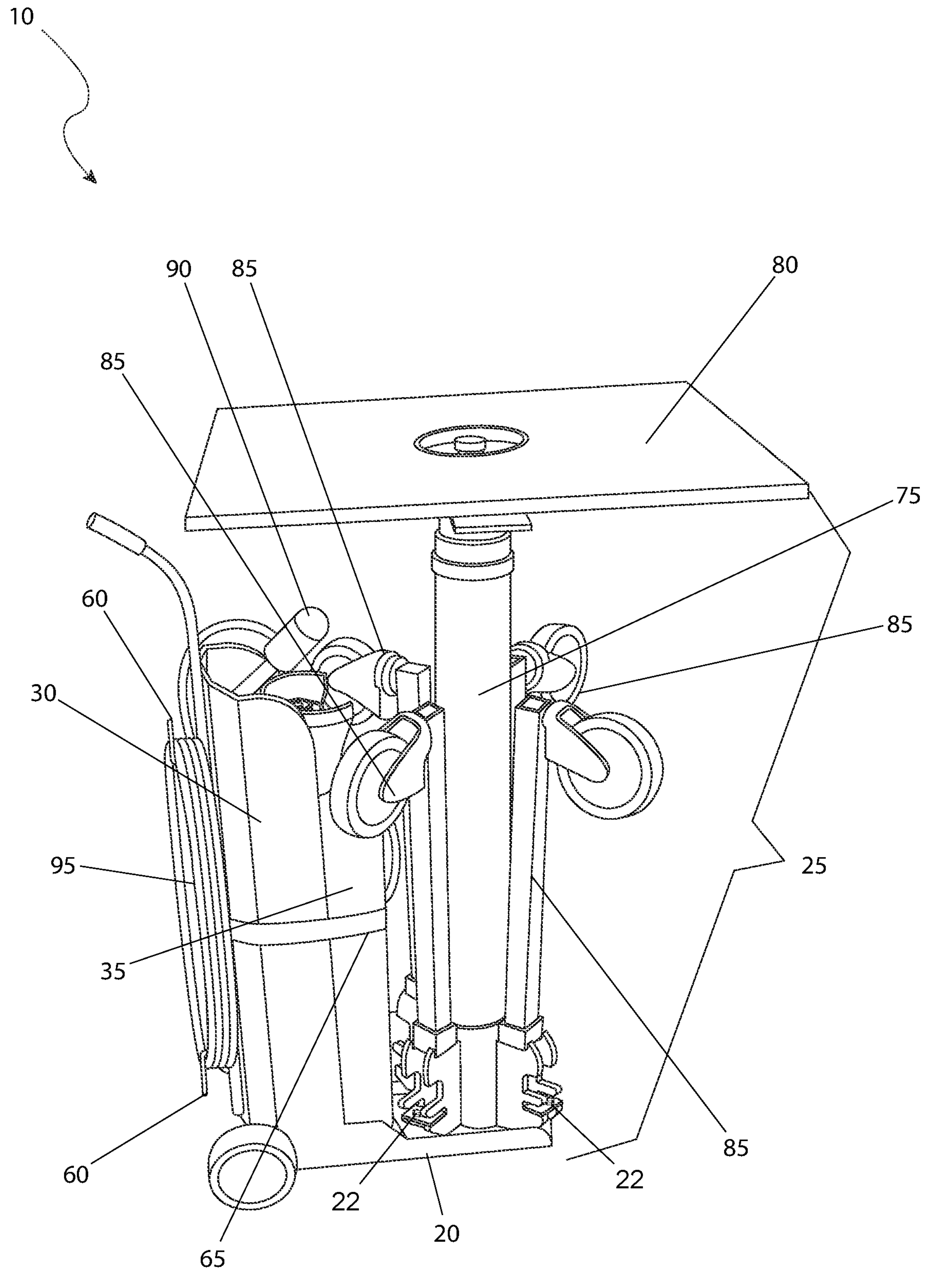
FIG. 2 is a perspective view of the material lift transport device 10, while holding a telescoping material lift 25 and a pressurized tank 35, according to the preferred embodiment of the present invention.

Referring next to FIG. 2, a perspective view of the device 10, while holding a material lift 25 and a pressurized tank 35, according to the preferred embodiment of the present invention is depicted. The material lift 25 typically comprises a main extendable shaft 75, an upper platen 80, and at least four (4) outrigger supports 85 and sits upon is removably attached to the bottom storage location 20 via the mounting bolts 22. It is envisioned that the generic design of the device 10 will be accommodating to all makes and models of material lift 25, and the use of the device 10 to any one (1) specific version of a material lift 25 is not intended to be a limiting factor of the present invention.

Under normal storage and transport conditions, the upper platen 80 is retracted as shown, and the outrigger supports 85 are folded upward as shown. The pressurized tank 35 is placed within the side storage location 30 as shown and secured in position with the attachment strap 65 and coupling means 70 (not shown due to illustrative limitations). The pressurized tank 35 is provided with various control means 90 such as control valves, pressure regulators, pressure valves and the like. The hose 95 which connects the pressurized tank 35 to the material lift 25 is shown in a coiled position around the hose holders 60, thus presenting a neat and organized appearance that maintains the hose 95 in a ready-to-use configuration that saves time and effort during use of the device 10.

Figure 3:
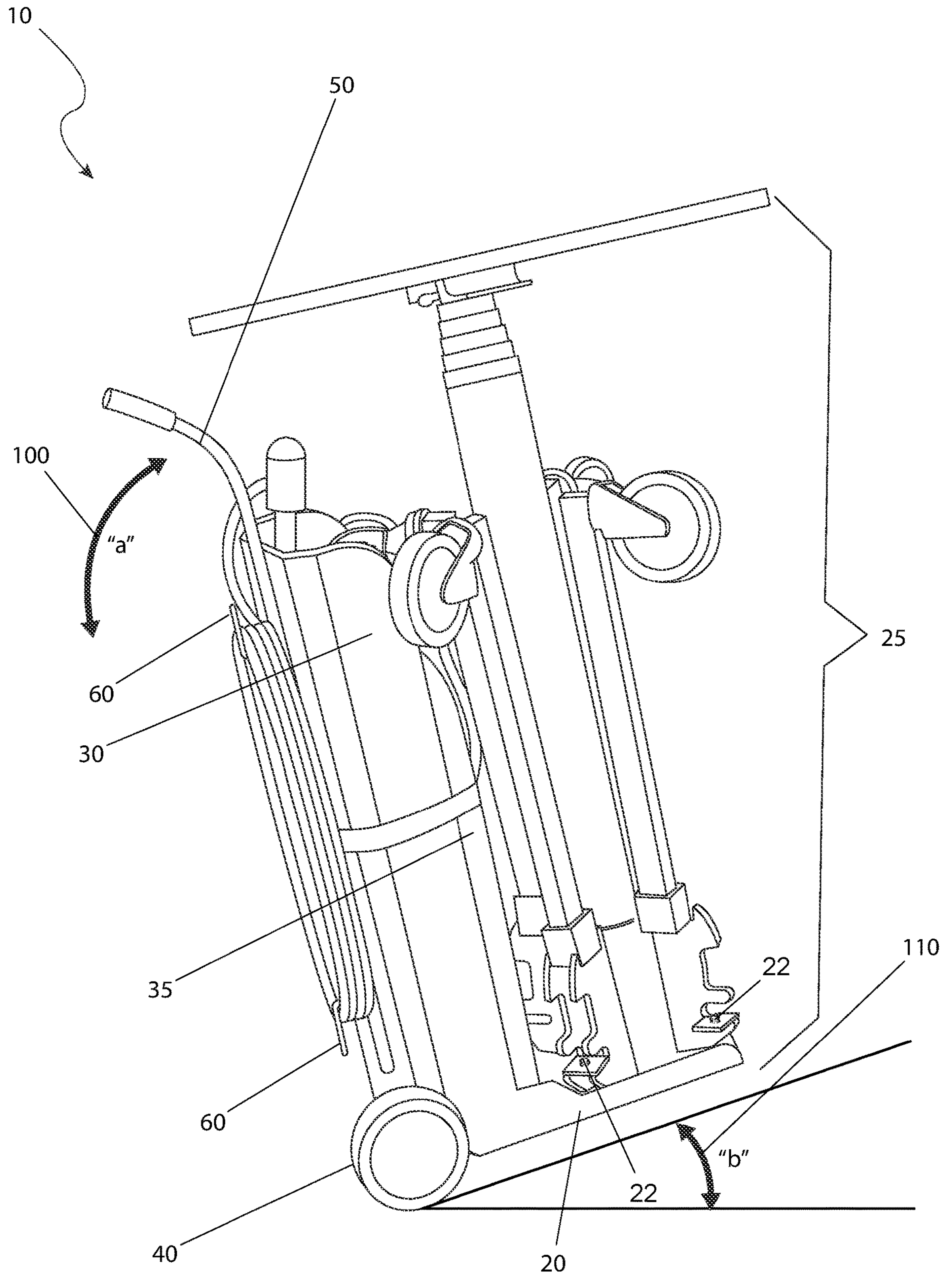
FIG. 3 is a perspective view of the material lift transport device 10, while transporting a telescoping material lift 25 and the pressurized tank 35, according to the preferred embodiment of the present invention; and, FIG. 4 is a perspective view of the material lift transport device 10, with the telescoping material lift 25 and the pressurized tank 35, shown in a utilized state, according to the preferred embodiment of the present invention.

Referring now to FIG. 3, a perspective view of the device 10, while transporting a material lift 25 and a pressurized tank 35, according to the preferred embodiment of the present invention is shown. During occasions when the device 10 must be transported to another physical location, the handle 50 is inclined backwards or away from the side storage location 30 along an inclined travel path "a" 100. This produces a corresponding and matching incline of the bottom storage location 20 away from grade 105 along a lift angle "b" 110. This places sole support for the device 10 on the two (2) wheels 40 (of which only one (1) is shown due to illustrative limitations). As such, the device 10 along with the material lift 25 and the pressurized tank 35 can be transported easily, much in the same manner as a hand truck, for long distances with a minimum of effort.

Figure 4:
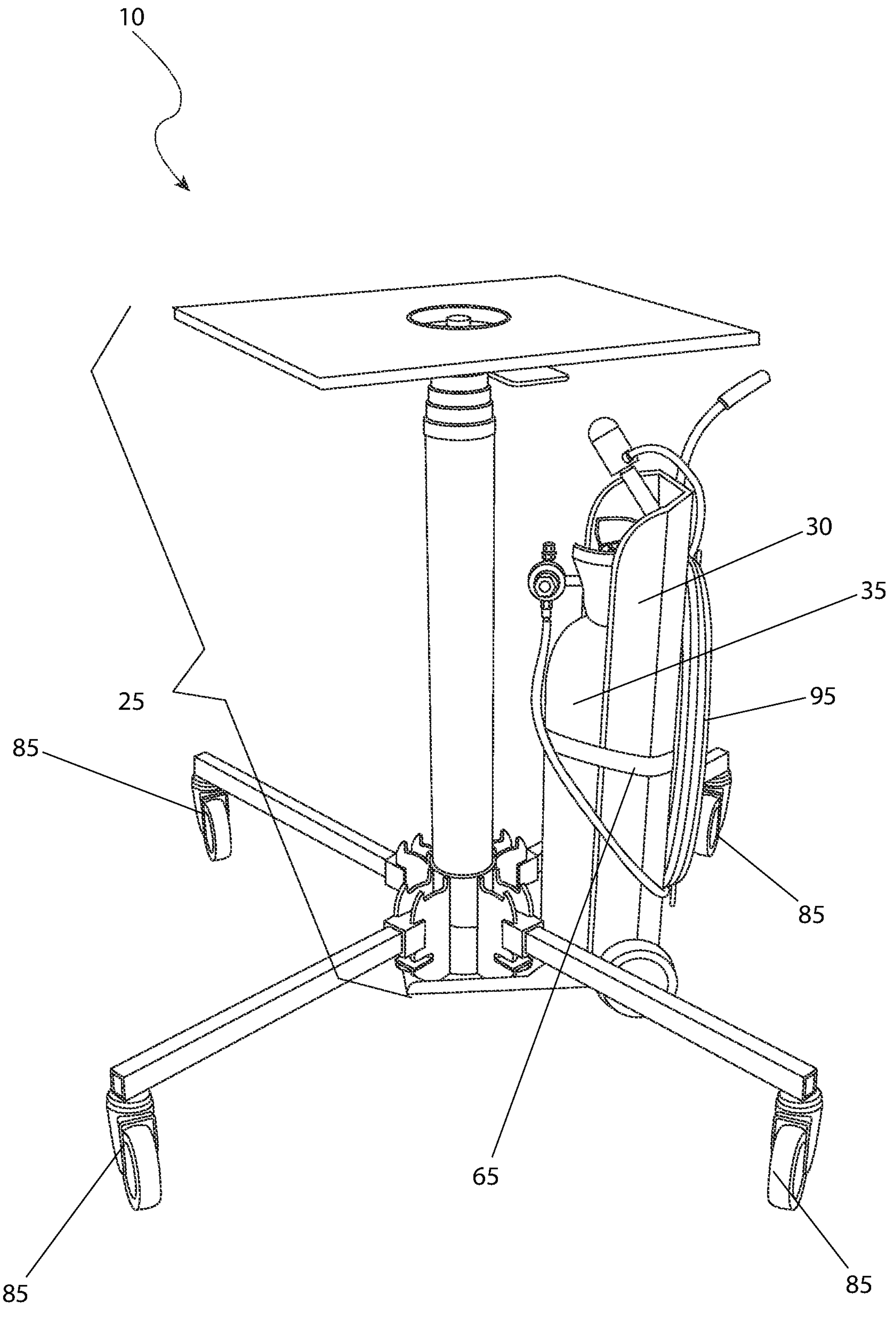

Referring to FIG. 4, a perspective view of the device 10, with the material lift 25 and the pressurized tank 35, shown in a utilized state, according to the preferred embodiment of the present invention is disclosed. The material lift 25 is positioned in the area of work, such as for the lifting of equipment (not shown) to be installed. The outrigger supports 85 are lowered and locked into position. This is accomplished while the material lift 25, as well as the pressurized tank 35 remains in place on the device 10. The outrigger supports 85 are so positioned such that they do not interfere with the device 10. As such, the device 10 may remain attached to the material lift 25 if needed during the usage process. However, it is noted that the material lift 25 and/or the pressurized tank 35 may be removed from the device 10 and used in a conventional manner. The material lift 25 would be removed while the pressurized tank 35 may remain in place within the side storage location 30 and as secured with the attachment strap 65. The hose 95 would be uncoiled from the hose holders 60 (not shown due to illustrative limitations) allowing the device 10 and the pressurized tank 35 to be located a distance away from the material lift 25 so as to not interfere with the work process.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 from conventional procurement channels such as hardware stores, home improvement stores, mechanical supply houses, mail order and internet supply houses and the like.

After procurement and prior to utilization, the pressurized tank 35 would be placed within the side storage location 30 and secured in position with the attachment strap 65 and coupling means 70. The hose 95 would be coiled upon the hose holders 60. The material lift 25 would be placed upon the bottom storage location 20 and removably attached thereto with the mounting bolts 22. At this point in time, the device 10 is ready for utilization.

During a preferred method of utilization, the device 10 would be lifted using the handle 50 and the ergonomic grip 55 along the inclined travel path "a" 100, such that the device 10 and its contents are balanced on the two (2) wheels 40. The user would then manually propel the device 10 to the location of use, such as for lifting of mechanical equipment to be installed. The material lift 25 may or may not be removed from the mounting bolts 22 of the bottom storage location 20. The outrigger supports 85 are then lowered into position and locked in a conventional manner. The hose 95 is connected to the control means 90 and the material lift 25 and the material lift 25 is used in a conventional manner to perform the desired lifting action.

After use of the device 10, the hose 95 is disconnected and recoiled on the hose holders 60, the material lift 25 is collapsed and its outrigger supports 85 folded upward to be retracted, and the material lift 25 is placed back upon the mounting bolts 22 of the bottom storage location 20. At this point, the device 10 and its stored components are reset, readying then for repeated use, as aforementioned described, in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A material lift transport device comprising:

a central "L"-shaped body;

a bottom storage location formed in the central "L"-shaped body, the bottom storage location configured to removably receive a telescoping material lift via a plurality of mounting bolts;

a side storage location formed adjacent to the bottom storage location, the side storage location configured to secure a pressurized tank;

an attachment strap with a coupling means securing the pressurized tank within the side storage location;

a pair of wheels supporting the central "L"-shaped body and facilitating transport of the device;

a central support frame extending from the wheels and terminating in a handle having an ergonomic grip; and, at least one hose holder affixed to a rear of the handle and configured to wind and store a hose in a ready-to-use configuration connecting the pressurized tank to the telescoping material lift when the telescoping material lift is removably mounted to the bottom storage location via the mounting bolts.

2. The material lift transport device of claim 1, wherein:

the telescoping material lift comprises a main extendable shaft, an upper platen, and at least four outrigger supports that are collapsible and foldable to allow for compact storage during non-use; and, the hose holder is generally "L"-shaped such that the hose stored thereon is maintained in the ready-to-use configuration when the telescoping material lift and the pressurized tank are deployed for operations while remaining attached to the device.

* * * * *